United States Patent [19]

Phillips et al.

[11] Patent Number: 4,647,966

[45] Date of Patent: Mar. 3, 1987

[54] STEREOSCOPIC THREE DIMENSIONAL LARGE SCREEN LIQUID CRYSTAL DISPLAY

[75] Inventors: Thomas E. Phillips; John Marez, both of San Diego, Calif.

[73] Assignee: The United States of America as represented by the Secretary of the Navy, Washington, D.C.

[21] Appl. No.: 801,021

[22] Filed: Nov. 22, 1985

[51] Int. Cl.[4] .............................................. H04N 13/00
[52] U.S. Cl. ....................................... 358/88; 358/92; 358/237; 350/331 R
[58] Field of Search ............... 358/88, 92, 3, 231, 358/237, 242, 60; 350/342, 351, 331 R, 374, 401, 402, 407, 132, 394; 353/7, 8; 346/17; 382/42

[56] References Cited

U.S. PATENT DOCUMENTS

| | | | |
|---|---|---|---|
| 2,118,160 | 5/1938 | Cawley | 358/88 X |
| 4,018,509 | 4/1977 | Boswell et al. | 350/342 |
| 4,295,159 | 10/1981 | Carollo et al. | 358/231 X |
| 4,461,542 | 7/1984 | Gagnon | 350/331 R |
| 4,464,018 | 8/1984 | Gagnon | 350/331 R |
| 4,464,019 | 8/1984 | Gagnon | 350/331 R |
| 4,544,237 | 10/1985 | Gagnon | 350/331 R |
| 4,556,986 | 12/1985 | Craig | 358/88 X |

Primary Examiner—Howard W. Britton
Assistant Examiner—Victor R. Kostak
Attorney, Agent, or Firm—Robert F. Beers; Ervin F. Johnston; Harvey Fendelman

[57] ABSTRACT

A three dimensional large screen liquid crystal projection display utilizes two liquid crystal light valves in tandem to produce polarization-type stereoscopic images in a large screen display format. Each light valve, driven separately by video input derived either from live scenes or computer generated data, presents one view of a stereoscopic image pair. Using one projection lamp, one projection lens, and a polarizing beamsplitter cube, the two images are optically combined and projected simultaneously onto a non-depolarizing screen. The particular optical geometry used results in orthogonal linear polarizations for the two images, so they can be viewed stereoscopically using polaroid glasses with appropriately oriented polarizing axes.

5 Claims, 5 Drawing Figures

STEREOSCOPIC THREE DIMENSIONAL LARGE SCREEN LIQUID CRYSTAL DISPLAY

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is related to a co-pending patent application in the U.S. Patent and Trademark Office, Ser. No. 723,372 entitled "Real-Time High-Resolution 3-D Large-Screen Display Using Laser Activated Liquid Crystal Light Valves" filed Apr. 15, 1985 by John A. Trias and commonly assigned along with the present application to the government of the United States as represented by the Secretary of the Navy. Application Ser. No. 723,372 and the invention claimed therein and the present application and the invention claimed herein were commonly owned by or subject to an obligation of assignment to the U.S. Government at the time the present invention was made.

BACKGROUND OF THE INVENTION

The present invention relates generally to the field of display systems and more specifically to large screen displays for presenting images to a number of viewers. More particularly, this invention provides for a large screen display system having the capability of operating in real-time at high resolution rates to provide a three-dimensional image of video information. Still more specifically, the present invention provides for the use of liquid crystal light valves to produce very bright stereoscopic three-dimensional images in a large screen format with computer control and computer image generation, in real time.

Stereoscopic imaging capability can be an important enhancement to displays which portary data containing altitude, distance and ocean depth information in conjunction with other inter-related operational parameters. The provision of such a display which has the ability to display the above types of information interactively in a real-time video format would greatly enhance the perception of such information.

The stereoscopic imaging process has two fundamental requirements. First, two distinct and different images must be presented to the viewer, each of which presents the scene from the view point of one of the viewer's eyes. Next, the system must be able to assure that each eye sees only the one view intended for it, that is, the images must be separated, one to each eye.

Four methods have been used for performing stereoscopic image separation:

(1) Optical separation using lenses, prisms, mirrors, etc.;
(2) Color separation (anaglyphs);
(3) Temporal separation (using shutters, etc.); and
(4) Polarization separation (using polaroid filters).

Of these, the one most amenable to large screen projection systems is the polarization technique. Optical separation requires bulky, often elaborate optical apparatus between the screen and the observer to separate the images. Color separation relies upon encoding the left and right images such that left eye and right eye images are portrayed in colors and such that the viewer sees two different color images. This makes it difficult to portray full color images, produces eye fatigue through "color bombardment" in the viewer which desensitizes the visual system to the colors involved and creates problems for ambient viewing. Temperal separation requires the viewer to wear glasses which are connected to the video system by an umbilical cord and often is accompanied by high voltages in the eyeglasses themselves. The polarization technique, on the other hand, requires only that the two images be projected with orthogonal polarizations, and that the viewer wear a simple pair of polaroid glasses whose polarization axes are arranged at right angles to one another.

Previous stereoscopic imaging techniques that have utilized polarization include those that use two parallel film channels as is depicted in FIG. 1, those using two separate video monitors as is depicted in FIG. 2 and those using projectors with rotating polaroids as is depicted in FIG. 3. The projection techniques most commonly used utilize film, as illustrated in FIG. 1. Parallel optical systems are used to project the two images of the stereo pair. Since film is used, this technique is not useable in video or real time, computer-generated applications. In FIG. 2, two video monitors are arranged at right angles. Each monitor displays one image of the stereo pair. The images are then polarized by filters, combined using a large beamsplitter, and viewed with polarized glasses. This technique is bulky, difficult to align, and is not useable in large screen applications. FIG. 3 shows a system that incorporates the EIDOPHOR projector for large screen presentation. Polarization is induced by a rotating polaroid wheel, which has adjacent sectors polarized at right angles. The video information is synchronized with this rotating wheel, right and left eye views being alternated on the screen. These are in viewed with polaroid glasses. While video can be displayed on this system, it requires a rotating mechanical device that is subject to mechanical failure, has questionable image separation (particularly at the intersections of the polaroid sectors), and requires extensive synchronizing electronics and motors to ensure the proper phasing of the displayed images with the rotating wheel.

SUMMARY OF THE INVENTION

The present invention is directed to providing an apparatus for displaying real-time, high-resolution, three-dimensional projected images on a distance screen at high definition video image signal rates for a number of viewers wearing polarized glasses. The display system of the present invention utilizes two liquid crystal light valves in tandem to produce polarization-type stereoscopic images in a large screen display format. Each liquid crystal light valve is driven separately by video input derived either from live scenes or computer generated data and each liquid crystal light valve presents one view of a stereoscopic image pair. One projection lamp, one projection lens and a polarizing beamsplitter cube are utilized to generate two images that are optically combined and projected simultaneously onto a non-depolarizing screen. Each liquid crystal light valve is "written on" by a separate cathode ray tube. The emitting region on the surface of each cathode ray tube faceplate is connected with the photoconducting region of the liquid crystal light valve by a plurality of optical fibers such that the surface of the cathode ray tube is mapped in a one-to-one correspondence with the photoconducting region of the liquid crystal light valve.

The particular optical geometry used results in orthogonal linear polarizations for the two images so that they can be viewed stereoscopically using polarized glasses with appropriately oriented polarizing axes such that the polarization of one lens of the glasses is orthogonal to the polarization of the other lens of the glasses.

The high intensity light source projects through a polarizing bi-prism creating first and second components of linearly polarized light. The first component of the linearly polarized high intensity light has its polarization state modulated in accordance with the voltage patterns created on the first liquid crystal light valve and the other, orthogonally disposed component of the linearly polarized high intensity light is similarly modulated by the voltage patterns on the other liquid crystal light valve. These two modulated high intensity components are reflected back from the light valves and through the bi-prism, where the modulated polarization patterns are converted to modulated intensity patterns, and onto a distant screen to present real-time, high resolution, three-dimensional projected images capable of being simultaneously observed by a number of viewers wearing polarized glasses.

OBJECTS OF THE INVENTION

Accordingly, it is a primary object of the present invention to provide a three-dimensional display on a distant wide screen for a number of viewers wearing polarized glasses.

Another object of the present invention is to provide a three-dimensional display system that operates at real-time high resolution video image signal rates.

Yet another object is to provide a pair of cathode ray tubes each activating a liquid crystal light valve representing left or right eye images of high intensity light through a polarizing bi-prism and onto a distant screen for simultaneous viewing by a number of viewers.

It is a concomitant object of the present invention to provide a display system having the capability for projecting overlapping stereoscopic image pairs with orthogonal polarization using simple optics.

A still further object of the present invention is to disclose a display system in which the images can be controlled and generated by a computer.

These and other objects of the invention will become more readily apparent from the ensuing specification when taken in conjunction with the appended claims and the accompanying drawings.

DESCRIPTION OF THE PREFERRED EMBODIMENT

Figure 1:
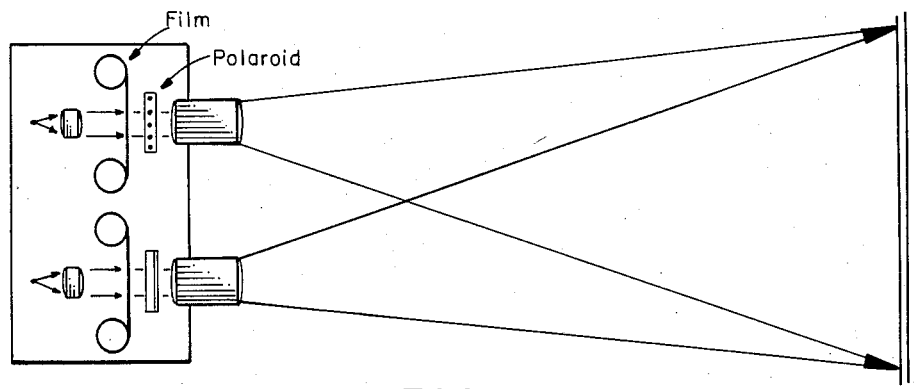
FIG. 1 is a schematic diagram of a prior art stereoscopic imaging technique utilizing two parallel film channels.
Figure 2:
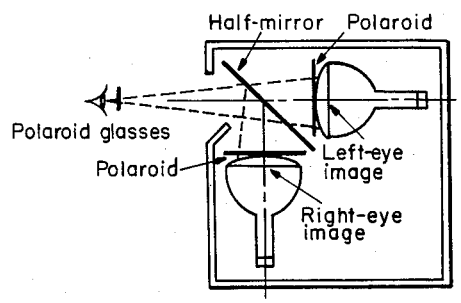
FIG. 2 is an illustration of a prior art imaging technique utilizing two separate video monitors.
Figure 3:
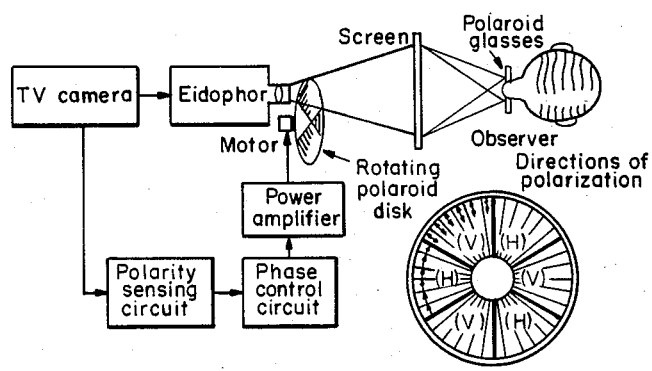
FIG. 3 is a schematic diagram of a prior art imaging system utilizing projectors with rotating polaroids.
Figure 4:
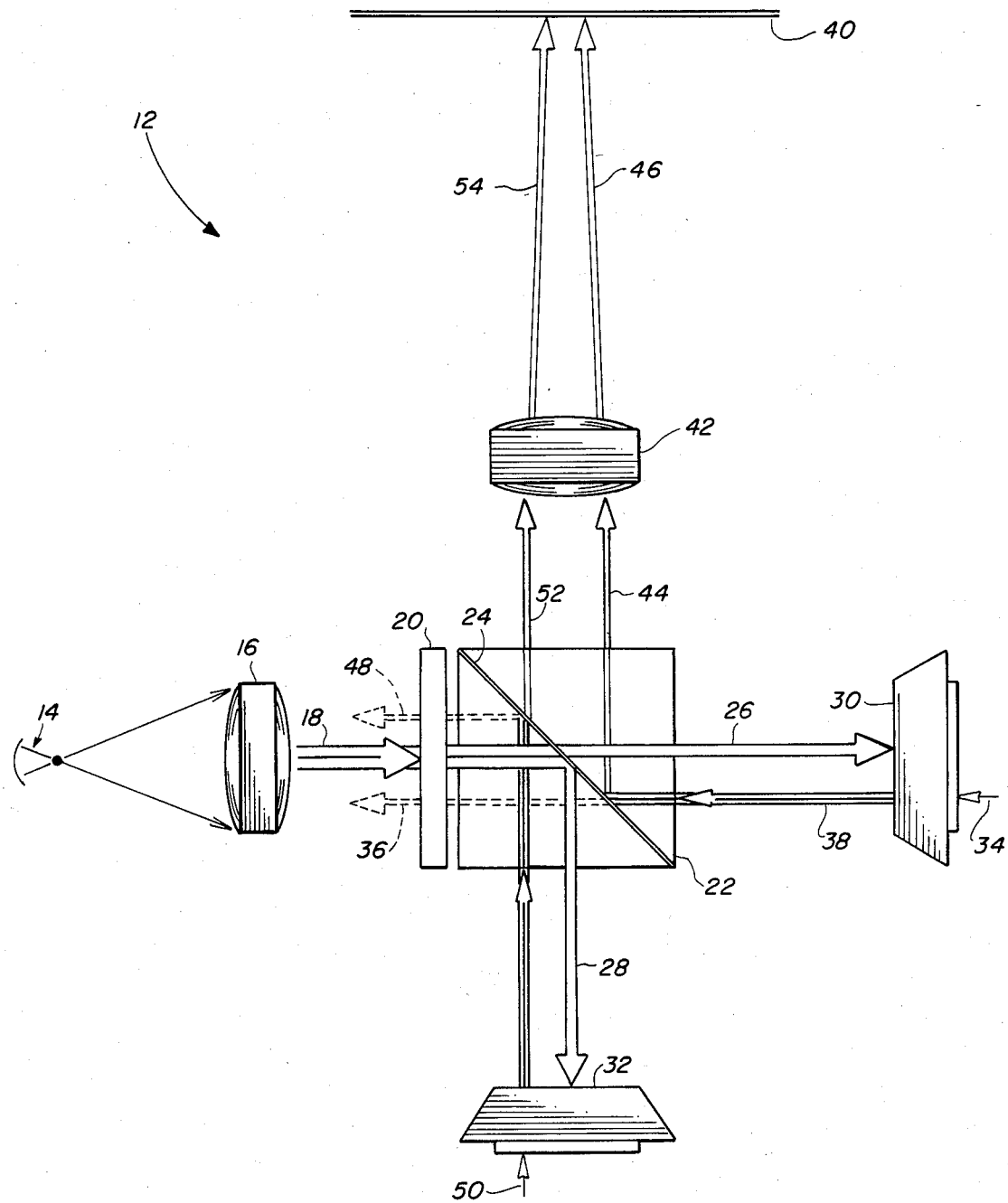
FIG. 4 is a schematic diagram of the optical components utilized in the display system of the present invention.
Figure 5:
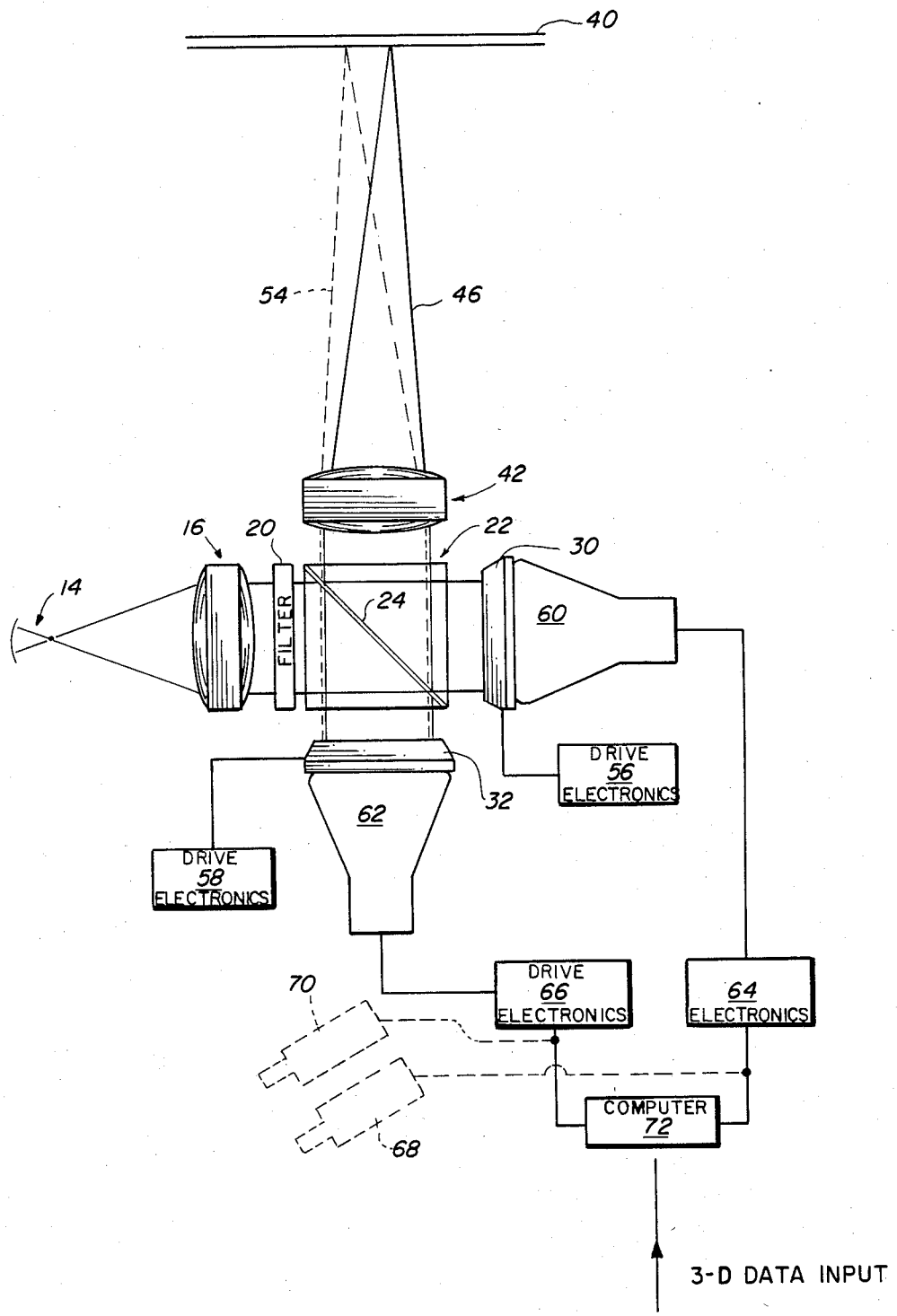
FIG. 5 is a schematic diagram of the same components as illustrated in FIG. 4 with the addition of the drive electronics used in the present invention.

Referring now to FIG. 4, the optics module 12 of the display system of the present invention will be described. The optics module 12 includes a projection lamp 14 aligned to shine through collimating optical lens 16. After the light from high intensity projection lamp 14 passes through and is collimated by the collimating lens 16, the light 18 passes through filter assembly 20 provided for filtering out infrared and ultraviolet light to thereby prevent damage to the two liquid crystal light valves to be described. After passing through the filter assembly 20, the light 18 enters the polarizing beamsplitter cube 22. The light entering the beamsplitter cube 22 is collimated but unpolarized. At the interface between the two halves of the cube 22 is a multilayered dielectric film 24 which splits the incident light 18 into two components as is well known. Incident light having polarization in the plane of incidence, i.e. the p-component, represented in FIG. 4 by the plane of the paper, is essentially entirely transmitted through the interface 24 emerging as beam 26 while the light having polarization perpendicular to the plane of incidence, i.e. the s-component, is entirely reflected at the interface 24 and emerges from the beamsplitter cube 22 as beam 28. The two linearly and orthogonally polarized light components 26 and 28 thus leave the cube 22 and propagate to their respective light valves as is described below.

Light valves 30 and 32 are situated to be irradiated by the light beams 26 and 28, respectively. The light valves 30 and 32 are liquid crystal light valves which are well known. As an example, Hughes Aircraft liquid crystal light valve model 10555 may be used to implement light valves 30 and 32. Hughes model 10555 has a photosensor with a 50 millimeter diameter and has a sensitivity of 100 microwatts per square centimeter or less at 514.5 nanometers. Briefly, the light valve operates such that when the writing light strikes the 50 millimeter diameter surface, it passes through a transparent conductive electrode and impinges on a photosensor layer, which in the above mentioned light valve is a cadmium sulfide layer that is responsive to light at this wavelength. The photosensor detects the writing light beam and impresses a voltage pattern on the nematic liquid crystal. The voltage pattern of the image on the liquid crystal electrooptically alters the optical properties of the crystal by the phenomenon known as bi-refringence. This valve acts like a controlled bi-refringent mirror and is used to rotate and hence, selectively modulate the polarization state of incident linearly polarized light for image generation.

At the light valves 30 and 32, the polarization state of the incident light 26 and 28, respectively, is modulated by an amount related to the writing intenstiy on the light valve's photoconductor. To explain this principle of operation, consider first the component 26 transmitted by beamsplitter 22. If there is no writing light 34 impinging on light valve 30, the polarization state of the incident projection light 26 is unaltered by the liquid crystal material of the light crystal light valve 30. In this case, the light is reflected back in the same polarization state that it has when it left the bi-prism 22 and is once again transmitted through the beamsplitter cube 22. This transmitted light is schematically illustrated in FIG. 4 as beam 36 illustrated in dotted lines. Thus, none of this light is ultimately transmitted to the display screen and an unwritten area on the light valve 30 results in a dark area on the final image on the display screen.

On the other hand, if writing light 34 is present on the photoconductor of the light valve 30, the liquid crystal material of light valve 30 becomes bi-refringent at that point thereby inducing an s-component into the optical field depicted as beam 38. Upon return to the beamsplitter cube 22, the s-component in beam 38 is reflected at the interface 24 to the display screen 40 through the projection optics 42. This reflected s-component is depicted in FIG. 4 as beam 44. An addressed portion of the photoconductor of the liquid crystal light valve 30 therefore produces a bright area in the final image made on display screen 40. It is noted that the light coming from light valve 30 produces a linearly polarized image with s-polarization at the display screen 40 as is represented by s-polarized light 46.

At the opposite light valve 32, an image is produced in a similar manner. Light 28 of s-polariation enters the light valve 32 after having been reflected by the interface 24 of the bi-prism 22. Unwritten areas on the photoconductor of the liquid crystal light valve 32 do not cause the liquid crystal material to modulate the projection light's polarization state. Thus, when the liquid crystal light valve 32 has not been written upon, light leaving the liquid crystal light valve 32 is still of the s-polarization and is therefore reflected by the interface 24 of the bi-prism 22 to emerge therefrom as s-polarization light beam 48. On the other hand, when writing light 50 is applied to liquid crystal light valve 32, the written areas of the photoconductor of the liquid crystal light valve 32 cause the liquid crystal material to induce a p-component into the reflected light. This p-component 52 is transmitted by the polarizing beamsplitter 22 through the interface 24 and is imaged onto the screen 40 via the projection optics 42. The image coming from liquid crystal light valve 32 therefore also produces a linearly polarized image but with p-polarization is is depicted by p-polarized light beam 54.

It can thus be appreciated that with this compact geometry as illustrated in FIG. 4, which includes only one projection lamp, one polarizing beamsplitter cube, and one projection lens, two distinct overlapping images can be produced, each formed from linearly polarized light but with orthogonal polarizations. This is precisely that which is required to allow stereoscopic separation with orthogonally polarized spectacles.

While it is to be unhderstood that the optics portion of the stereoscopic display system of the present invention is illustrated in FIG. 4, each liquid crystal light valve 30 and 32 has its own power drive electronics 56 and 58 to activate the liquid crystal-photoconductors 30 and 32 as is well known. In accordance with the present invention the image writing light that is utilized to modulate the polarization and intensity of the projection light 18 my be furnished by two cathode ray tubes such as cathod ray tubes 60 and 62, respectively, Thus, cathode ray tube 60 is used as the source of writing light to produce images on the liquid crystal light valve 30 and cathode ray tube 62 is used as the source of writing light to produce images on the liquid crystal light valve 32. In this embodiment the emitting region on the surface of each cathode ray tube 60 and 62 is connected with the photoconducting region of the respective liquid crystal light valve 30 and 32 by a plurality of optical fibers (not shown) such that the surface of each cathode ray tube 60 and 62 is mapped in a one-to-one correspondence with the photoconducting region of the respective liquid crystal light valve 30 and 32. For example, the system of the present invention may be implemented such that the cathode ray tube 60 will display the right eye perspective view of the stereo pair and at the same time the cathode ray tube 62 will display the left eye perspective view of the stereo pair. In other words, the light from the cathode ray tubes 60 and 62 cause the liquid crystal light valves 30 and 32, respectively, to produce a stereoscopic pair of images with orthogonal polarization as described above.

In order to supply video data to the cathode ray tubes, each cathode ray tube 60 and 62 is driven by its own electronics module 64 and 66, respectively. The electronics modules 64 and 66 accept video data in any standard (including high definition TV) format derived from a suitable source such as a computer or, for instance, the navy's tactical data system (NTDS) or from a 3-D digitize and the modules then convert the video data into the appropriate forms for driving the cathode ray tubes 60 and 62. For instance, the electronics drive network 64 and 66 may be implemented by a Conrac Monitor, model QQA15/N which is comprised of the synchronizing circuitry, the deflection drivers, the video signal modulator and the associated high voltage power supply.

Alternatively, the video data furnished to the electronics modules 64 and 66 can be generated by a pair of appropriately arranged video cameras 68 and 70 having their video outputs connected to the inputs of the electronics modules 64 and 66. With this arrangement, real world scenes can be displayed on display screen 40.

As a further alternative implementation, computer generated data can be utilized to provide an image on the display screen 40. In this implementation, a computer 72 may be utilized to generate the video data signals. The computer could either be programmed to synthetically produce the video signals or it can receive an input video data stream from a video data source such as the NTDS in the form of three dimensional coordinates of a desired image point or symbol. The computer then calculates where this three dimensional point would appear in the left eye perspective view and where it would appear in the right eye perspective view. This would be repeated for all points and symbols in the scene to be displayed. By way of example, in this computer generated data implementation, computer 72 may be implemented as state above with a computer or with a microprocessor having connected to it dual graphic buffer cards, one each for the left eye and right eye channels, which graphic buffer cards may be implemented with Peritek model VRH-Q. Any desired image processing can also be done within the computer 72. The computer 72 then puts the right eye 64 and left eye 66 electronics modules.

Obviously, many modifications and variations of the present invention are possible in the light of the above teachings. It is therefore to be understood that within the scope of the appended claims the invention may be practiced otherwise than as specifically described.

We claim:

1. An apparatus for displaying three-dimensional projected images on a distant screen comprising:
    first means for receiving a first sequency of light beams and for selectively changing the polarization orientation of linearly polarized light incident thereon in response to said first sequence of light beams;

second means for receiving a second sequence of light beams and for selectively changing the polarization orientation of linearly polarized light incident thereon in response to said second sequence of light beams;

first writing means, operably connected to said first means fore receiving, for selectively generating said first sequence of light beams;

second writing means, operably connected to said second means for receiving, for selectively generating said second sequence of light beams; and means disposed for projecting a high intensity light beam onto said first and second means for receiving;

said first and second means for receiving and said means disposed for projecting being positioned with respect to each other such that light reflected from said first means for receiving does not impinge upon said second means for receiving and such that light reflected from said second means for receiving does not impinge upon said first means for receiving.

2. The apparatus of claim 1 wherein said means disposed for projecting comprises:
one and only one bipolar prism; and
a high intensity light source disposed to irradiate said bipolar prism.

3. The apparatus of claim 1 wherein said first and second writing means comprise first and second cathode ray tubes optically coupled to said first and second means for receiving, respectively.

4. The apparatus of claim 3 wherein:
said first and second means for receiving comprise first and second liquid crystal light valves.

5. The apparatus of claim 4 further comprising:
first and second cathode ray tube electronics drive modules respectively connected to said first and second cathode ray tubes.

* * * * *